United States Patent [19]

Hanemaayer

[11] Patent Number: 4,620,741
[45] Date of Patent: Nov. 4, 1986

[54] COMBINATION TABLE SUPPORT AND TRUNK ACCESS SYSTEM FOR A RECREATIONAL VEHICLE

[75] Inventor: Jacobus N. Hanemaayer, Kitchener, Canada

[73] Assignee: Hanmar Home Equipment Limited, Kitchener, Canada

[21] Appl. No.: 789,031

[22] Filed: Oct. 18, 1985

[30] Foreign Application Priority Data

Sep. 6, 1985 [CA] Canada .................................. 490179

[51] Int. Cl.⁴ .............................................. B60R 7/04
[52] U.S. Cl. ................................ 296/37.14; 108/150; 296/156
[58] Field of Search ............ 296/37.14, 37.5, 22.24 R, 296/156; 108/150

[56] References Cited

U.S. PATENT DOCUMENTS 3,391,960 7/1968 Megargle et al. ................ 296/24 R
3,476,432 11/1969 Aliment et al. .................... 296/156
4,256,340 3/1981 Dunchock .......................... 296/24 R Primary Examiner—Randolph Reese
Assistant Examiner—Carol L. Olson
Attorney, Agent, or Firm—Cushman, Darby & Cushman

[57] ABSTRACT

A recreational vehicle has a dining area including a table mounted above the floor with a storage compartment being provided in the floor with at least a substantial part of the storage compartment being positioned below the top of the table. An access cover for the storage compartment is removably disposed over the entrance to the compartment, the same being positioned directly below the table top to allow access to the storage compartment from either the front or the rear relative to vehicle. The table includes a first leg mounted in or on the floor and adapted to support the table top at a point adjacent one end thereof. A second leg is detachably secured at its upper end to another point on the table top and at its lower end to either one of a spaced pair of points on the floor adjacent the entrance to the storage compartment. The second leg is inclined either forwardly or rearwardly depending on at which of the spaced points the second leg is secured so as to facilitate access to the storage compartment from either the front or the rear of same, respectively, its position being reversible at the will of the user.

7 Claims, 4 Drawing Figures

COMBINATION TABLE SUPPORT AND TRUNK ACCESS SYSTEM FOR A RECREATIONAL VEHICLE

BACKGROUND OF THE INVENTION

This invention relates to recreational vehicles and in particular to a table support arrangement which combines with an under the floor storage compartment so as to provide easy access thereto.

It is known to provide recreational vehicles with a storage compartment mounted in or below the vehicle floor in a convenient location. One such convenient location is adjacent the rear end of the vehicle. In the case where the rear end of the vehicle is provided with a door, the storage compartment is accessible from both the rear of the vehicle via the open door and from the interior of the vehicle. In many recreational vehicle designs it is also desirable to provide a dining area which is located in close proximity to the storage compartment. In order to conserve space it is desirable in many cases for the dining area table top to be co-extensive with or to extend at least partially over the storage compartment disposed in the floor. The problem then is one of providing adequate support to the table while at the same time providing for ready access to the storage compartment.

One possible solution would be to support the dining table with a single leg arrangement which is offset from the storage compartment. However, this poses a problem in that a single support leg structure for a dinette size table for four or more persons usually results in a rather wobbly table. (One leg is sufficient only for a small coctail table.) A wobbly table is an annoyance and results in spillage of foodstuffs etc. Attempts have been made to stabilize the table by the addition of a second leg. However, since the table overlies at least a substantial portion of the storage compartment, the addition of a second leg poses difficulties since the access cover for the storage compartment is likely to obstruct the second leg or vice versa.

Another possible solution to the problem of providing ready access to the floor storage compartment would be to provide a table leg arrangement which can be lifted up and removed altogether to provide access; however this arrangement would be cumbersome and time consuming to use. Another possible solution would be to make the table top smaller so as to permit reasonably stable support of same by a single leg. However this has obvious disadvantages since many recreational vehicles are designed to accommodate 4 to 6 people and there is an obvious need for a reasonably sized dining table if all persons using the vehicle are to dine together.

SUMMARY OF THE INVENTION

It is a general object of the present invention to provide a system which gives stable support to a reasonably sized dining table while at the same time providing ready access to an under the floor storage compartment positioned generally below the dining table in a recreational vehicle. A further object is to provide a support arrangement for a table which includes the use of a reversible table leg which can be positioned for substantially unobstructed access to a floor storage compartment located beneath the table.

Accordingly the invention relates to a recreational vehicle having a dining area including a table mounted above the floor with a storage compartment being provided in the floor with at least a substantial part of the storage compartment being positioned below the top of the table. An access cover for the storage compartment is removably disposed over the entrance to the compartment, the same being positioned directly below the table top to allow access to the storage compartment from either the front or the rear relative to vehicle. The table includes a first leg mounted in or on the floor and adapted to support the table top at a point adjacent one end thereof. A second leg is detachably secured at its upper end to another point on the table top and at its lower end to either one of a spaced pair of points on the floor adjacent the entrance to the storage compartment. The second leg is inclined either forwardly or rearwardly depending on at which of the spaced points the second leg is secured so as to facilitate access to the storage compartment from either the front or the rear of same, respectively, its position being reversible at the will of the user.

Further features and advantages of the invention will become apparent to those skilled in this art from the following description of a preferred embodiment of same read in conjunction with the appended drawings.

BRIEF DESCRIPTION OF THE VIEWS OF DRAWINGS

In drawings which illustrate an embodiment of the invention:

DETAILED DESCRIPTION OF THE PREFERRED EMBODIMENT

Figure 1:
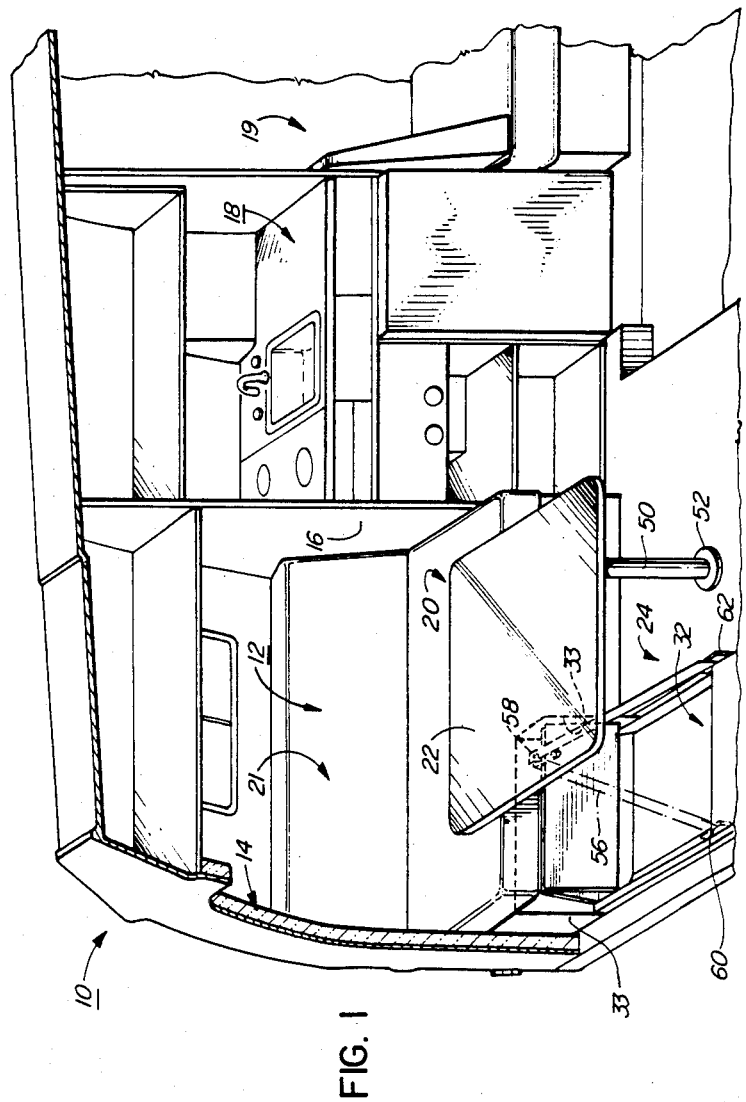
FIG. 1 is a cut-away perspective view of a rear portion of the recreational vehicle incorporating the principles of the invention.

Referring now to the drawings, there is shown a rear end portion of the recreational vehicle 10, such rear end portion including a dining area generally designated by reference numeral 12. The recreational vehicle includes a rear doorway 14 which is normally closed by a door (not shown). Immediately forward of the dining area 12 is a partition 16 with a central opening being provided leading into a kitchen area 18. Forwardly of the kitchen area there is provided a front seating area 19, the seats of which may be convertible into a sleeping area all as described in my copending U.S. Pat. No. 4,550,946. A shower stall and toilet facility may be provided opposite the kitchen region 18 and suitable movable partitions may be provided to segregate the central utility area occupied by the kitchen facility 18, toilet and shower stall facilities, from the remaining sections of the vehicle, all as described in detail in the aforementioned copending application Ser. No. 409,549.

With particular reference to the dining area 12 it will be noted that it includes a centrally located table 20 having a generally rectangular top 22 mounted in a horizontal position above the vehicle floor 24.

Figure 3:
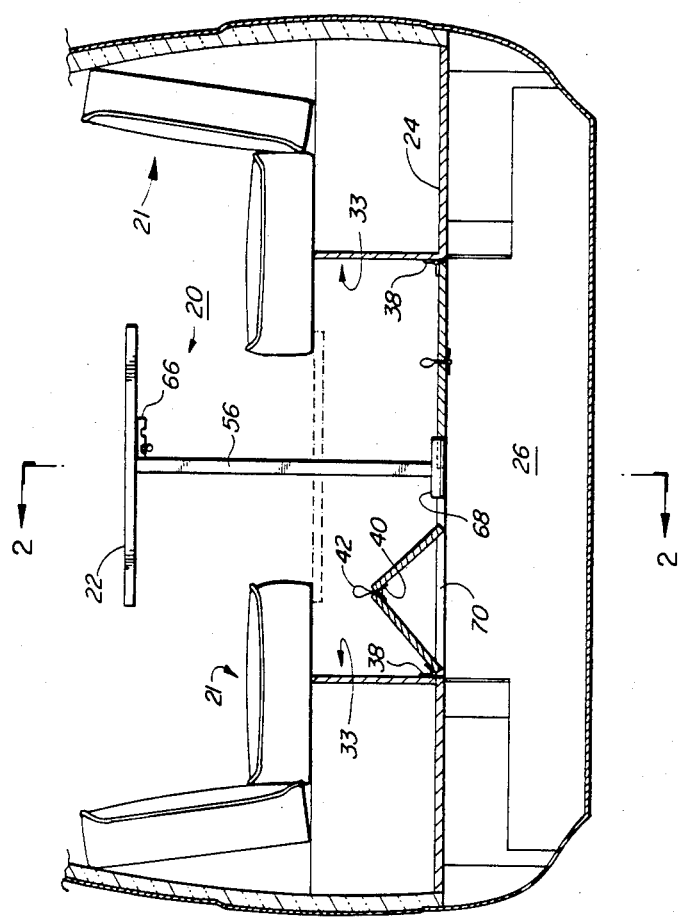
FIG. 3 is a partial section view taken transversely of the rear portion of the recreational vehicle along line 3—3 of FIG. 4.
Figure 4:
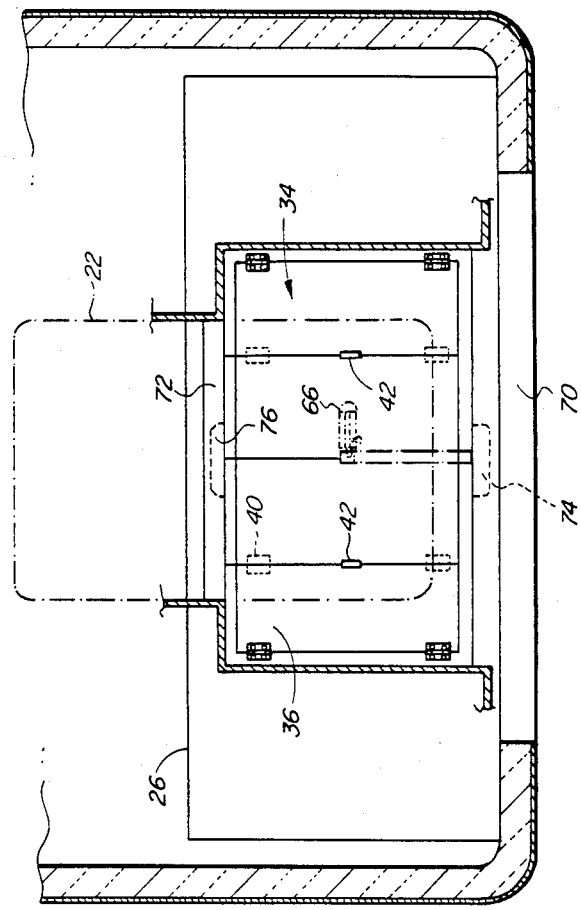
FIG. 4 is a partial plan view of the rear portion of the recreational vehicle in the dining area thereof, the table top being shown in phantom.

A storage trunk 26 is suspended below the floor 24 by means of hanger bolts 28 and support straps 30. A large rectangular access opening is provided in floor 24, a substantial portion of such access opening being located directly below the table top 22 as best seen in FIG. 4. Also as seen in FIG. 4, the perimeter of the trunk extends outwardly beyond the perimeter of the access opening 32 by a substantial distance. The access opening 32 is normally closed by means of an access cover 34 comprising two pairs of panels 36, with each pair of panels being hinged by hinges 38 at opposing ends of the access opening 32 with the panels of each pair also being hinged together by way of intermediate hinges 40. Lift tabs 42 are provided, as seen in FIGS. 3 and 4. When these lift tabs are grasped and lifted upwardly, the panels of each pair fold relative to one another, and when moved upwardly into vertical positions adjacent opposing ends of the access opening 32, full access may be had to the interior of the storage compartment 26.

A pair of bench seats 21 are located on opposing sides of table 20 closely adjacent opposing side walls of the recreational vehicle. Box-like compartments are provided beneath these seats which may be used for storage. These are recessed as illustrated by reference number 33 thereby to allow the panels of the access cover 34 to be moved to the "open" positions.

Because of the location of the storage compartment 26 and its access opening 32 adjacent the rear of the vehicle, ready access thereto may be had from the rear of the vehicle by way of the doorway 14 provided at the rear end of the vehicle. Access to the storage compartment may also be had from the front i.e. from the interior of the vehicle.

Referring again to the table 20, it will be noted that the rectangular top 22 of same is supported in a horizontal position above the storage compartment 26 by means of first upright leg 50 which is shown as being in the form of a cylindrical post, the lower end of which is snugly mounted in a floor mounting element 52. The upper end of leg 50 is securely connected to the table top 22 adjacent the forward end thereof by means of an inverted cup-like mounting bracket 54. This off-center mounting arrangement is necessary owing to the large size of the table and to the presence of the storage compartment 26 coupled with a fact that the available space is quite restricted making it necessary for the table top to extend over a substantial portion of the access opening 32 to the storage compartment.

Figure 2:
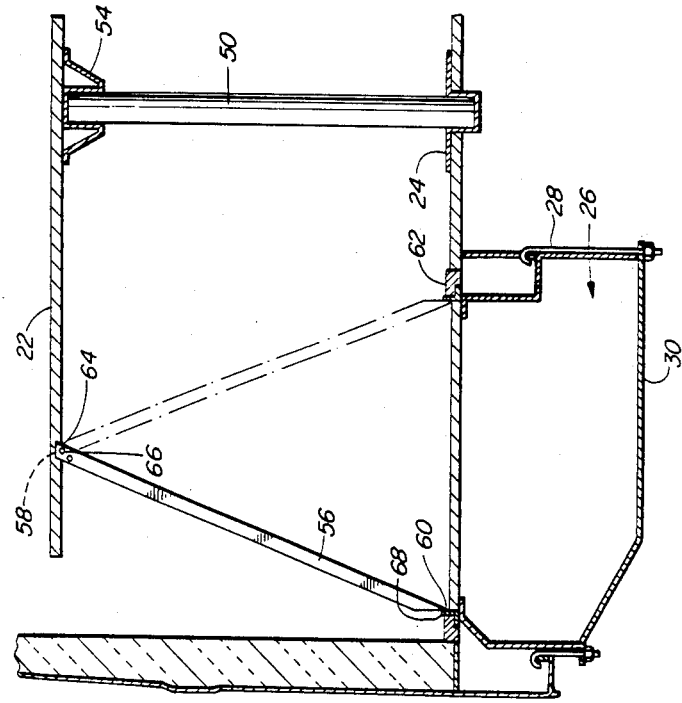
FIG. 2 is a partial section view of the rear portion of the recreational vehicle taken along section line 2—2 of FIG. 3.

Since the table would be unstable and far too wobbly if used with only a single support leg 50, provision is made in accordance with the invention for a second reversible table leg 56 which is detachably secured at its upper end to a point 58 on the table top overlying the storage compartment adjacent the opposite end of table top 22 and at its lower end to either one of a spaced apart pair of points 60 and 62 closely adjacent opposing frontal and rear margins of the access opening 32 to the storage compartment. This reversible leg 56 is inclined, as best seen in FIG. 2, either forwardly or rearwardly depending on at which of these spaced points 60, 62 the lower end of reversible leg 56 is secured so as to facilitate access to the storage compartment from either the front or the rear, respectively. For example, as best seen in FIG. 2, when reversible leg 56 is located in the full line position, access to the storage trunk from the interior of the vehicle is facilitated. However, when reversible leg 56 is in the dashed line position, access to the storage trunk from the rear of the vehicle, through doorway 14, is facilitated.

In order to detachably secure the upper end of reversible leg 56 to the underside of table top 22, the underside of the table top is provided with a notch 64 into which the upper end of reversible leg 56 can be fitted. Directly opposite this notch 64 and secured to the underside of the table there is provided a barrel bolt lock 66 of conventional design, having a sliding bolt which fits into an aperture 66 drilled in the upper end of the reversible leg 56. This arrangement firmly connects the upper end of reversible leg 56 to table top 22 while at the same time permitting ready detachability.

In order to stabilize the reversible leg 56 and prevent lateral movement of same, the lower end of leg 56 is firmly welded to a short length of transversely arranged angle iron 68. The frontal and rear margins of the access opening 32 are provided with elongated nosing strips 70 and 72. Each nosing strip 70, 72 is provided with a horizontal slot 74, 76, each such slot being substantially the same length as the length of the angle iron 68 on the lower end of reversible leg 56. The slots 74, 76 are designed to snugly accommodate the horizontally extending leg of the angle iron 68. Hence, with the angle 68 firmly secured in a respective one of the slots 74, 76, lateral movement of the reversible leg 56 is substantially prevented thus stabilizing the table top 22. Additionally, it should be noted that the angle 68 cannot be accidentally removed from the slots 74, 76 by virtue of the fact than when the multi-panel access cover 34 is positioned to close access opening 32, the central panels 36 are located in abutting relationship with angle 68 thus holding it firmly in position within a respective slot 74 or 76.

When one wishes to change the position of the reversible leg 56, the access cover 34 is lifted upwardly by virtue of the previously noted lift tabs 42, the barrel bolt 66 is shifted so as to release the top of the reversible leg 56 from the table top 22, and the angle 68 is removed from one of the slots 74, 76, and positioned in the opposing slot, following which the barrel bolt 66 is utilized to secure the upper end of the leg 56 to the table top and the access cover 34 is moved to the horizontal position covering access opening 32.

It has been found that the reversible leg 56 holds the table in a more stable position than does a conventional table leg normally used in a recreational vehicle. The above-noted angle 68 welded to the bottom of the reversible leg and the horizontally extending leg of it inserted in the slot in or under the nosing with the vertically extending leg of the angle lodged in the marginal space provided when the access panels are closed prevents the table from swaying sideways. The angled position of the reversible leg (in either forward or rearward position) in conjunction with the conventional upright leg 50 keeps the table from moving front to back. The end result is that this table with the reversible leg feature coupled with one conventional leg is more stable than a table with two conventional legs. The reversability feature permitting ready access to the storage compartment from either the front or the rear is of considerable practical value.

I claim:

1. A recreational vehicle including a floor, a dining area including a table having a top mounted above the floor, a storage compartment in or below said floor, at least a substantial part of which compartment is located directly below said table top, an access cover for the storage compartment movably disposed over the entrance to the storage compartment and positioned below the table top to allow access to the storage compartment from either the front or the rear relative to the vehicle, said table including a first upright leg mounted to said floor and supporting the table top at a point adjacent one end of the latter, and a second leg detachably secured at its upper end to another point on the table top and at its lower end to either one of a spaced pair of points on said floor adjacent opposing margins of the entrance to said storage compartment, said second leg being inclined either forwardly or rearwardly depending on at which of said spaced points said lower end of said second leg is secured so as to facilitate access to the storage compartment from either the front or the rear thereof, respectively.

2. The recreational vehicle according to claim 1 wherein said another point on the table top overlies said storage compartment and is adjacent an opposite end of the table top, and said spaced pair of points being adjacent opposing fore and aft margins of the entrance to said storage compartment.

3. The recreational vehicle according to claim 2 wherein the lower end of said second leg has a transverse flange fixed thereto, and means defining a slot at each of said spaced pair of points adapted to receive said flange therein to stabilize said second leg and reduce lateral wobble of the table.

4. The recreational vehicle according to claim 3 wherein said table top has releasable lock means therein to releasably secure said upper end of the second leg to the table top.

5. The recreational vehicle of claim 3 wherein said access cover is adapted to butt against said lower end of the second leg to secure the latter at the selected one of the spaced pair of points.

6. The recreational vehicle of claim 3 wherein said access cover is adapted to butt against said lower end of the second leg to secure the latter at the selected one of the spaced pair of points and wherein said another point on the table top overlies said storage compartment and is adjacent an opposite end of the table top, and said spaced pair of points being adjacent opposing fore and aft margins of the entrance to said storage compartment.

7. The recreational vehicle of claim 2 wherein said dining area is adjacent the rear end of the vehicle, the vehicle having a rear door and said storage compartment being adjacent said rear door for ready access thereto.

* * * * *